United States Patent [19]

Liggett et al.

[11] Patent Number: 4,668,535
[45] Date of Patent: May 26, 1987

[54] PROCESS FOR PREPARING A FUEL TANK OF POLYURETHANE LAMINATE HAVING CONTIGUOUS CONTRASTING LAYERS

[75] Inventors: Paul E. Liggett, Wooster; David L. Braun, North Canton, both of Ohio

[73] Assignee: Goodyear Aerospace Corporation, Akron, Ohio

[21] Appl. No.: 646,677

[22] Filed: Sep. 4, 1984

Related U.S. Application Data

[62] Division of Ser. No. 502,867, Jun. 9, 1983, Pat. No. 4,565,729.

[51] Int. Cl.$^4$ .............................................. B05D 7/22
[52] U.S. Cl. ................................ 427/230; 264/246; 264/255; 427/407.1; 427/409; 427/412.1
[58] Field of Search ............... 264/129, 132, 245, 246, 264/34; 427/9, 412.1, 230, 409, 407.1, 412.1; 428/423.3

[56] References Cited

U.S. PATENT DOCUMENTS

| | | | |
|---|---|---|---|
| 1,206,291 | 11/1916 | Barr | 427/9 |
| 3,893,727 | 7/1975 | Desilets | 427/412.1 |
| 3,911,178 | 10/1975 | McDowell et al. | 427/412.1 |
| 4,247,678 | 1/1981 | Chung | 528/83 |

*Primary Examiner*—Donald Czaja
*Assistant Examiner*—Jennifer Cabaniss
*Attorney, Agent, or Firm*—P. E. Milliken; D. J. Hudak

[57] ABSTRACT

A plurality of polyurethane layers, some of which have a contrasting color with respect to an adjacent layer is formed into a laminate. During preparation, each layer is separately formed, as by spraying, and the contrasting color ensures that the preceding layer can be fully covered. The laminate can be utilized to cover areas or objects which are otherwise difficult to ensure that it has a continuous or complete coating. The invention is suitable for use as a coating and for the preparation of various in situ articles or enclosures, for example a fuel tank, such as commercial and military aircraft.

10 Claims, 2 Drawing Figures

PROCESS FOR PREPARING A FUEL TANK OF POLYURETHANE LAMINATE HAVING CONTIGUOUS CONTRASTING LAYERS

This is a division of application Ser. No. 502,867, filed June 9, 1983 now U.S. Pat. No. 4,565,729.

TECHNICAL FIELD

The present invention relates to a polyurethane laminate having at least some contrasting layers. The contrasting color ensures that each preceding layer can be fully or continuously covered during preparation of the laminate. Thus, an in situ formation of a fuel tank in an aircraft can be made.

BACKGROUND ART

Heretofore, laminates have generally been prepared from similarly colored layers.

With regard to integral fuel tanks, they have also been made from one or more layers of a clear or identically colored elastomer layer such as a polyurethane.

A polyurethane which has been utilized as a coating for a rubber-fabric fuel tank is set forth in U.S. Pat. No. 4,247,678 to Chung. However, if more than one layer was applied, only one similar color was utilized. Furthermore, Chung does not relate to any in situ formation of a fuel tank, or an article. The components of the Chung formulation have poor stability in that the component other than the amine curative component would start to react with itself or crosslink with the isocyanate therein and thus generally had to be utilized within a week after preparation thereof.

Heretofore, other integral fuel tanks have generally been made of metal structures wherein sealing materials have filled openings, cracks, and the like, with the apparatus then being bolted closed. Such apparatus required tedious, laborious and costly preparation and may be used as a back-up system in the present invention.

Although the present invention utilizes a polyurethane having an overall formulation which is generally similar to the formulation set forth in Chung, U.S. Pat. No. 4,247,678, it relates to the application of contrasting layers to form an article, as for example an in situ article, as well as to various separate components which form the overall polyurethane formulation, the components of which have unexpected and very long shelf life of a matter of months and even years.

DISCLOSURE OF INVENTION

It is therefore an aspect of the present invention to provide a polyurethane laminate having a plurality of contrasting layers.

It is another aspect of the present invention to provide a contrasting polyurethane laminate, as above, when at least one of said layers has a colorant such as a pigment or dye therein.

It is a further aspect of the present invention to provide a contrasting polyurethane laminate, as above, wherein said individual layers are made from a polyurethane formulation formed by combining various components, each said component having a very good shelf life.

It is a further aspect of the present invention to provide a contrasting polyurethane laminate, as above, wherein each layer generally covers a preceding layer.

It is yet another aspect of the present invention to provide a contrasting polyurethane laminate, as above, wherein an article can be formed in situ.

It is yet another aspect of the present invention to provide a contrasting polyurethane laminate, as above, wherein said layers are free from agglomerates.

It is yet another aspect of the present invention to provide a contrasting polyurethane laminate, as above, wherein said in situ article can be a fuel tank, as for example a fuel tank located in the fuselage or wing of an aircraft.

It is yet a further aspect of the present invention to provide a contrasting polyurethane laminate, as above, wherein said in situ fuel tank laminate dramatically increases the fuel capacity of an aircraft.

These and other aspects of the present invention will become apparent from the following specification.

In general, an aspect of the present invention relates to a polyurethane laminate, comprising: at least a first polyurethane layer, and a second contiguous polyurethane layer having a contrasting color with respect to said first layer.

Another aspect of the present invention relates to a process for preparing a polyurethane laminate comprising the steps of: forming a first polyurethane layer; and forming at least one contiguous polyurethane layer, at least one of said contiguous layers being of a contrasting color to an adjacent layer.

BRIEF DESCRIPTION OF DRAWINGS

For a better understanding of the present invention, reference is made to the drawings wherein.

BEST MODE FOR CARRYING OUT THE INVENTION

According to the concepts of the present invention, the coverage of alternating layers of a polyurethane laminate is facilitated and ensured. This is accomplished by utilizing adjacent layers of a color which is different from that of the preceding layer. In other words, a contrasting color is utilized in the various adjacent layers. The contrasting polyurethane layers can be applied to various substrates, to various forms, to various molds, and the like. Moreover, it can be applied to an existing device to form an in situ article. The invention is especially suitable in applying a laminate to an area or object which is difficult to cover, and/or to view.

The invention will be more fully described in association with the formation of an in situ fuel tank such as that located inside an aircraft wing or fuselage.

Heretofore, when one or more coats would be applied to an object, inasmuch as the polyurethane was the same color, it would be very difficult to determine if an appropriate thickness was achieved or obtained in desired areas or areas which were difficult to coat and/or view.

Figure 2:
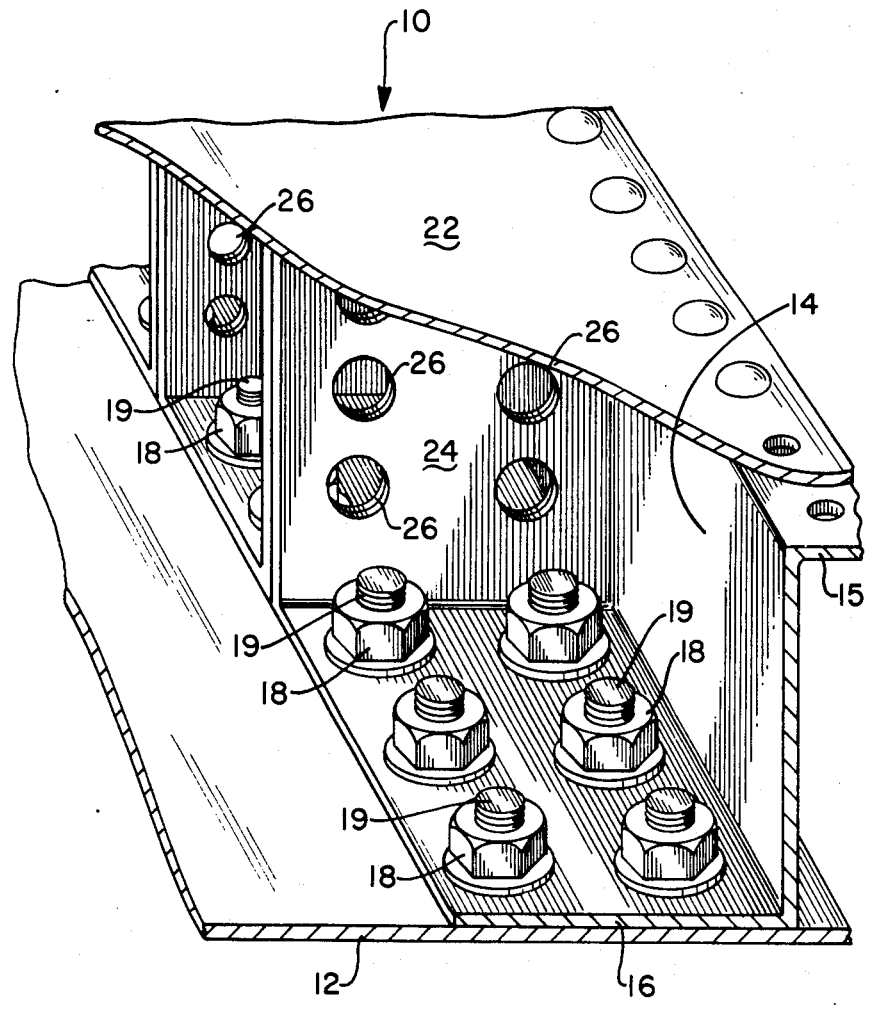
FIG. 2 is a perspective view showing a portion of a cut-away fuel tank cavity before application of the polyurethane laminate.

Referring to FIG. 2, a portion of a fuel tank is shown. The fuel tank portion generally indicated by the numeral 10 has a bottom plate 12 and an end wall 14. The end wall has a bottom flange 16 extending therefrom. End wall 14 is connected to bottom plate 12 through a plurality of nuts 18 and bolts 19. Top plate 22 is connected to end wall 14 through an upper flange 15 utilizing any conventional fastening means such as nuts and bolts, not shown. The fuel tank which may be found in any aircraft wing structure, fuselage, or the like, generally has various compartments therein separated by side wall 24. The side wall may be integral with end wall 14, as shown, or it may be fastened thereto as through the use of nuts or bolts. Typically, side wall 24 will have apertures 26 therein to permit the fuel to flow from one compartment to another compartment.

It is to be understood that fuel tank portion 10 is merely a representative embodiment and that numerous different types of tanks of various shapes, sizes, engaging plates, walls, and the like can be utilized.

As apparent from FIG. 2, various areas of the fuel tank portion would be difficult to coat, especially when utilizing a spraying apparatus. Difficulty is encountered in small areas such as nooks and corners in that it is often difficult to determine whether an adequate amount of sealant material has been sprayed therein to cover all cracks, crevices or openings. It is often furthermore difficult to determine whether the backside of a fastener, for example a rivet, screw, nut, etc., has been coated. Thus, problem or trouble areas include corners, edges, blind spots and the like such as pockets, and other edges which can only be observed by the use of mirrors. Although such areas can be initially coated, viewed with a mirror and then subsequently coated with additional layers of a fuel-resistant or solvent-resistant material, inasmuch as the material is generally the same color, it is difficult to determine whether small cracks or fractures exist, or whether an adequate thickness has been applied to prevent cracking under stress or in use.

According to the present invention, a polyurethane as set forth hereinbelow can be utilized in either forming an article or in forming an in situ fuel tank as by coating the fuel tank cavity shown in FIG. 2. Moreover, an in situ fuel tank can be formed by applying the polyurethane directly to portions of the wing structure, fuselage, or the like.

Generally, a plurality of polyurethane layers is applied to form a laminate 40. Thus, a first polyurethane layer can be applied to fuel tank 10 in any conventional manner as by brushing, spraying, dipping and sloshing, and the like. Once all surfaces have been covered utilizing a polyurethane of a specific color, a second contiguous or adjacent layer is applied to said first layer, once again in any conventional method or manner.

It is an important aspect of the present invention that the second layer be of a color which is different or in contrast to the color of the first layer. Accordingly, the second layer can contain an appropriate amount of a colorant, for example a pigment or dye such as to distinguish it visually from the first layer upon the application thereof. Any number of contrasting layers or colors can be utilized. Examples of suitable contrasting layers include black and white, light green and black, yellow and black, light blue and black, green and orange, and the like. Generally, any suitable amount of dye or pigment can be utilized to tint or color the layer to render it distinguishable from the previous layer. As a rough approximation, based upon 100 parts of urethane polymer or prepolymer in the overall polyurethane formulation, from about ½ to about 20 parts by weight of a colorant in the form of a dye or pigment can be utilized with from about 1 to 8 parts being desired. As with the first layer, any type of polyurethane can be utilized for any article so long as the urethane is suitable for its end use. Thus, in the preferred embodiment of the present invention, a fuel or solvent-resistant polyurethane is utilized in the second layer as well as in any and all subsequent layers.

Second layer 44 is applied to the first layer 42 until all of the contrasting color of the first layer is completely covered, that is, has disappeared. According to such a process, hard-to-reach or questionably coated areas are readily discerned from one another such that all portions of the object are completely coated. Once the difficult area has been coated, it can be further coated for awhile to ensure that a desirable thickness thereof has been achieved.

In a similar manner as with the first and second layers 1 and 2, any number of additional layers, each desirably having a color contrasting to the previous layer, can be applied to achieve a desired overall thickness of the object. The application time between layers will vary with the thickness and type of urethane curing agent utilized, but usually will be from about 5 to 30 minutes. Once, the preceding layer has dried to a tacky finish, the following layer can be applied. Generally, with regard to fuel tanks, anywhere from 2 to 7 layers can be constructed, with the final laminate preferably having from about 4 to 6 layers. Generally, the thickness of each layer ranges from about 5 to about 20 mils with from about 10 to about 15 being preferred. With regard to top plate 22, it need not be coated but can exist as bare metal inasmuch as it is through such member that the various contrasting coats are applied. Upon completion of coating the article, a sealant layer of a material, for example a polysulfide is laid around the parameter of the article with top plate 22 being fastened thereto. In such a manner, a permanent fuel tank can be formed.

When formed in such a manner, the in situ fuel tank results in a dramatic increase in storage or fuel capacity in that there is no wasted space as in with conventional fabric-rubber laminated fuel tanks which are separately made and then inserted into the wing or fuselage assembly. Generally, a volume increase of about 20 percent, or even greater, is acheived. Such additional fuel storage capacity results in significant advantages in commercial aircraft, especially in military aircraft.

Figure 1:
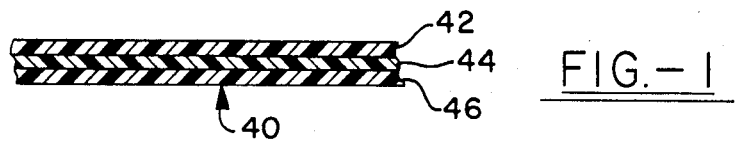
FIG. 1 is a cross-sectional view of a laminate of the present invention.

In such a manner, a laminate can be made, whether in situ or applied to an existing article or substrate as for example shown in FIG. 1. The laminate, generally indicated by the numeral 40, has only three layers, a first layer 42, a contrasting second layer 44, and a third contrasting layer 46. Of course, laminate 40 may generally contain any number of suitable layers having at least one or more and preferably each layer being of a contrasting color to a previous or contiguous layer.

In addition to fuel tanks for aircraft or other vehicles such as buses, cars, tanks, other uses of the contrasting layers include wear indicators, for example radomes for aircraft, for radar detection stations, etc., helicopter rotors which indicate wear with regard to rain abrasion, sand abrasion, etc., flexible seals, rollers as for example conveyor belt rollers, and the like.

With regard to the formation of an in situ polyurethane laminate as an integral fuel tank, a flexible but fuel-resistant polyurethane is desired.

A particular polyurethane which has been found to have good fuel resistance as well as flexibility is similar to that set forth in U.S. Pat. No. 4,247,678 to Chung and is hereby fully incorporated with regard to the type and preparation of such a polyurethane. In order that the polyurethane formulation has good stability before application, it is made in separate components of a urethane component in which a urethane is dissolved in a solvent, a curing agent component in which a curing agent is dissolved in a solvent, and a cement component which generally contains a colorant an epoxy, a solvent, and optionally a leveling agent. A thixotropic compound can be contained in either the cement component, the cure component, or in both, generally depending upon the pressure of the spraying apparatus. When combined, the components form a polyurethane formulation generally having an overall solids content of from about 20 percent to about 60 percent, preferably from about 40 percent to about 50 percent, and optimally about 42 to 43 percent by weight based upon the total weight of the polyurethane formulation containing all three components. The solid content is generally important in that too much solvent results in loss of an adhesive type film in that the polyurethane when used as a coating or paint would tend to run whereas too little solvent would result in a porous layer.

Essentially, the urethane polymer or prepolymer is made by reacting an aliphatic or alicyclic polyisocyanate, preferably an alkyl or a cycloalkyl polyisocyanate, with a polyester derived from the reaction of a glycol and a mixture of or co-condensation of an aliphatic dicarboxylic acid, preferably an alkyl dicarboxylic acid, and/or an aromatic dicarboxylic acid. The aliphatic or alkyl polyisocyanate can contain from 3 to 12 or more carbon atoms, with from 6 to 10 being preferred, and the alicyclic or cycloalkyl polyisocyanate can have from 5 to 25 or more carbon atoms, with from 8 to 15 being preferred. Generally, diisocyanates are preferred. An example of a preferred polyisocyanate is methylene bis(4-cyclohexylisocyanate), sold under the trademark Desmodur W, manufactured by Mobay Chemical Corporation.

Suitable polyols include those having a molecular weight of 500 or less, or desirably 200 or less. Preferably, the polyol is a glycol containing at least 2 carbon atoms as from 2 to about 10 carbon atoms, with from about 4 to about 6 being desired. Examples of specific glycols include 1,6-hexane diol, 1,4-butane diol, and ethylene glycol. The various hexane diols are preferred.

The aliphatic or alkyl dicarboxylic acids generally contain from about 2 to about 12 carbon atoms and preferably from about 6 to 9 carbon atoms. Specific examples include glutaric acid, adipic acid, and pimelic acid, with azelaic acid being preferred. Similarly, the aromatic dicarboxylic acids can contain from 8 to about 12 carbon atoms with 8 carbon atoms being preferred. Examples of such acids include terephthalic acid, phthalic acid, and naphthalene dicarboxylic acid, and the like, with isophthalic acid being preferred. The ratio of the aliphatic dicarboxylic acids to the aromatic acids in either the co-polymerization condensation reaction or as a physical mixture varies from 10 to 90 percent by weight. The polyester is formed by the reaction of the acids and the glycol according to any conventional process and generally has a molecular weight of from about 500 to about 4,000, with from about 1,000 to about 3,000 being preferred. The ratio of the equivalent amount of isocyanate used to the equivalent amount of hydroxy end groups in the polyester ranges from about 1.5 to about 3.0 and preferably from about 1.8 to about 2.2.

Any conventional solvent can be utilized to dissolve the urethane polymer or prepolymer. Specific examples include aromatic compounds having from 6 to 10 carbon atoms and aliphatic, preferably alkyl substituted compounds having from 3 to 8 carbon atoms. Examples of aromatic solvents include xylene, toluene, benzene, and the like, whereas examples of aliphatic compounds include methyl ethyl ketone, methyl isobutyl ketone, and the like. An amount of solvent is utilized such that the amount of urethane solids in the polymer component ranges from about 50 to about 75 percent, desirably from about 60 to about 65 percent, and optimally from about 63 to about 65 percent by weight.

The cure component comprises an amine curing agent or polyol in a solvent. Generally, any conventional amine curing agent, e.g., normal or fast, can be utilized such as alkyl diamines containing from 2 to 10 carbon atoms, cycloalkyl diamines containing from 4 to 20 carbon atoms, an aromatic or alkyl substituted aromatic diamines having from 6 to 20 carbon atoms. Examples of specific normal diamine curing agents include propylenediamine, 1,4-cyclohexane-bis(methylamine), and metaphenylenediamine. A preferred diamine compound is methylenedianiline (MDA). Naturally, faster or slower types of diamines can be utilized, if desired, to effect an appropriate cure time, or dry time to tack. That is, the amount of time required to such an individual layer is tacky and subsequent layer can be applied thereto. Thus, often it is desirable to use a so-called "fast" type curing amine compound. Such amines are well known to the art. Specific examples include $H_{12}$ MDA, that is (bis-4-aminocyclohexyl) methane; MXDA, that is metaxylene diamine; 1,3-BAC, that is 1,3-bisaminomethylcyclohexane, ethylene diamine, hexamethylene diamine, and the like. Although polyols having 2 or 3 hydroxyls of less than 400 molecular weight can be utilized, they are generally too slow reacting and, hence, are not favored. Examples of such polyols are the same as set forth above with regard to the urethane, such as the various glycols, e.g., 1,4-butane diol, etc.

The curing agent is dissolved in any conventional solvent such as the same solvents utilized with the urethane polymer, for example, an aromatic or an aliphatic. Examples of specific solvents include methyl ethyl ketone, methyl isobutyl ketone, toluene, and the like. The amount of solvent is such that the amount of solid diamine contained therein generally ranges from about 5 to about 30 percent by weight, desirably from about 10 to about 15 percent, and optimally about 13 to about 15 percent by weight. Of course, it should be understood that the amount of solvent in the cure component, as in the polymer component, can be varied over a wide range so long as the total solvent or percent solids in the final paint, when all three components are combined, is as set forth above. The amount of diamine or polyol when combined with the polymer component is such that the equivalent ratio of diamine or polyol to diisocyanate ranges from about 0.8 to about 1.2, desirably from 0.9 to about 0.95, and optimally about 0.93. Excessive amounts of diisocyanate will result in reduced hydrolysis resistance whereas too small amounts will result in unsuitable solvent or jet fuel resistance and a reduced cure rate.

Inasmuch as the overall polyurethane formulation is generally based upon 100 parts by weight of the urethane polymer, the amount of the urethane solvent can be readily calculated therefrom. Similarly, the amount of diamine can readily be calculated by the equivalent ratio of diisocyanate to diamine. Hence, the amount of diamine solvent can also readily be determined.

The third component, that is the cement component generally comprises a colorant, a leveling agent, an epoxy compound, and a solvent. Moreover, either the cement component, the cure component, or both, can contain a thixotropic agent. Should the polyurethane formulation be sprayed at a relatively low pressure, e.g., 150 psi or less, 100 psi or less, or even at 50 psi or less, the thixotropic agent is desirably blended in the cure component when a pigment is utilized. Otherwise, at low pressures, when a pigment is used in the cement component, agglomerations, globules, etc., usually form due to contact of the thixotropic agent and the pigment. Such agglomerations can often plug the spray gun and/or result in a rough coating surface. Such a problem can be eliminated if the formulation is strained, as through an 80 to 100 mesh screen. However, this process is not practical in large batch operations since the straining must be performed on cement that contains the diamine accelerator. Such could result in a permanent clogging of the strainer with reacted urethane.

A thixotropic agent is important in that it is utilized to generally keep the polyurethane from running. The amount of thixotropic agent generally ranges from about 2 parts to about 8 parts by weight based upon 100 parts by weight of urethane in the overall polyurethane formulation, and desirably from about 3 to about 6 parts. Generally, any conventional thixotropic compound can be used. Suitable thixotropic agents include silicon dioxide, Cab-o-Sil (Cabot Corp.), surface modified aluminum silicate, manufactured by Georgia Kaolin Company and sold under the brand name Kaophile #2, and the like. These compounds generally exist as very fine particles so that they can be incorporated in the overall paint formulation and sprayed as from a spray gun.

Although a leveling agent is generally utilized such that the paint surface is smooth, it need not always be included in the paint formulation. Generally, any conventional leveling agent can be utilized such as cellulose acetate butyrate and "Modaflow," manufactured by Monsanto Industrial Chemicals Company. The amount of the leveling agent generally varies from about 0.5 parts by weight to about 3 parts by weight, based upon 100 total parts by weight of urethane in the formulation. A more desired range is from about 0.5 parts to about 1.25 parts by weight. Inasmuch as the leveling agent tends to reduce surface tension and hence tends to counteract a thixotropic agent, high amounts thereof are not utilized.

With regard to the epoxy compound, a nonleachable type is preferred such that it does not leach out in the presence of solvents or fuels residing upon the final paint formulation. An example of one such specific epoxy resin is Epon 1001, manufactured by the Shell Chemical Company. Generally, this epoxy is 4,4′isopropylidenediphenol-epichlorohydrin. Another suitable epoxy is D.E.R. 732, manufactured by the Dow Chemical Company. This epoxy is an epichlorohydrin-polyglycol reaction product. The amount of epoxy generally ranges from about 3 to about 7 parts by weight with from about 5 to about 6 being preferred, based upon 100 parts by weight of urethane polymer in the overall final polyurethane formulation.

The amount of solvent in the cement component can vary over a wide range and exists in such amounts such that when the three components are blended together, the total amount of solids in the overall paint formulation ranges from about 20 percent to about 60 percent by weight. Typically, the amount of solvent existing in the cement component ranges from about 25 parts by weight to about 250 parts by weight, with from about 50 to about 200 parts being desired, based upon 100 total parts by weight of urethane polymer or prepolymer in the formulation. The solvents can be any of the types utilized in the polymer component or the cure component. Thus, toluene, xylene, methyl ethyl ketone, methyl isobutyl ketone, and the like, or combinations thereof, can be utilized.

Each fraction or component of the polyurethane formulation of the present invention unexpectantly has very good stability and thus good shelf life. Thus, the various separate components can be made and kept separate for a number of months and then brought together and mixed in any conventional manner and applied to a substrate. For example, the components can be fed through three separate lines to a spray gun where they are then mixed together and sprayed upon a desired substance or substrate. Generally, any conventional type of mixing device can be utilized as well as any conventional type of spraying apparatus such as any airless type spray gun. The application of the polyurethane formulation to the substrate can be through a spray gun, through brushing, coating, or the like. Upon application, the various solvents evaporate and the diamine curing agent reacts with the polyurethane to yield a cured polyurethane formulation. Although cure can be at ambient temperature, that is for example 65° F., generally heat is applied to speed the curing operation. Cure can thus occur from about ambient temperature to about 180° F. and preferably from about 140° to about 160° F. Heating at higher temperatures tends to create a porous paint and, hence, is undesirable. Generally, any desired thickness can be applied at one application and any number of applications can be applied to yield a desired thickness. Usually, the final thickness can range from about 10 to about 50 mils.

With regard to the actual mixing, the three components are generally mixed simultaneously or within a short time period of one another, as for example a few minutes. Alternatively, the cement component can be mixed with the polymer component, but such cement-polymer mixture should be combined with the cure component generally within a few days since stability of the cement-polymer component is not very good.

The polyurethane formulation, when prepared according to the present process, has good flexibility, good resistance to hydrolysis, and has excellent resistance to fuels, and the like. Moreover, the polyurethane paint forms a very good sealant coat. Accordingly, it can be utilized to contain fuels as for automobiles, aircraft, and the like, as noted above.

As previously noted, the polyurethane formulation can contain an amount of colorant such as a pigment or dye therein. Desirably, a carbon black pigment is utilized to yield a black polyurethane which can be contrasted against many other colors. Generally, a white pigment such as titanium dioxide can be utilized to form a white color. When other colors are desired, titanium dioxide is utilized in association with small amounts of other pigments or dyes, for example chromate pigments, chromic oxide and ultramarine blue, and the like. However, in utilization with a fuel-resistant cell, titanium dioxide is generally not dispersible in the cement component. In order to render it dispersible, it is utilized in an epoxy base. However, such epoxy base tends to weaken said layer with regard to fuel leaching. Accordingly, the layer in contact with the fuel is desirably a non-white layer, for example a layer containing carbon black therein.

The invention will be better understood by reference to the following examples.

TABLE

| Formulation | A | B | C | D |
|---|---|---|---|---|
| Prepolymer (% NCO = 3.35)* | 100.00 | 100.00 | 100.00 | 100.00 |
| Toluene | 56.27 | 56.27 | 56.27 | 56.27 |
| "Modaflow" | 1.00 | 1.00 | 1.00 | 1.00 |
| "EPON 1001-B-80" | 6.25 | 6.25 | 6.25 | 6.25 |
| "Cab-o-Sil M-5" | 4.58 | 2.25 | 4.58 | 4.58 |
| Carbon Black | 1.27 | 1.27 | — | 1.27 |
| Methyethylketone (MEK) | 59.07 | 14.35 | 70.80 | 59.07 |
| 60% titanium dioxide in/"EPON 828" | — | — | 10.48 | — |
| Methylenedianaline (MDA) | 7.34 | 7.34 | 7.34 | — |
| Metaphenylenediamine (MPD) | — | — | — | 4.00 |
| MEK | 43.50 | 7.34 | 44.79 | 45.59 |
| Total | 279.28 | 196.07 | 301.51 | 278.03 |
| Percent Solids | 42.68 | 59.60 | 42.59 | 41.67 |
| diamine/diisocyanate ratio | .93 | .93 | .93 | .93 |

*polyhexamethylene isophthalate/azelate having a molecular weight of 2,000 made with methylene bis(4-cyclohexylisocyanate).

Each polyurethane formulation was made as follows: The urethane component was prepared by mixing the prepolymer with the solvent in a container having an inert atmosphere therein such as nitrogen. Upon mixture thereof, the container was sealed with the inert gas therein to protect it from moisture. The cement component was made by adding the various ingredients to a container and mixing. Desirably, the cement component was sealed in an airtight container. Similarly, the ingredients of the curing component were added and mixed in a suitable container and then sealed.

After storage for at least three weeks, the polymer component, the cement component, and the cure component of Formulation A were fed to a spray gun and sprayed within an aircraft wing assembly for the purpose of forming a fuel tank or cell therein. No spraying problems were encountered nor was there any problem with forming a suitable fuel tank. In such a manner, all three of the components of Formulation C were added to a spray gun and also sprayed into a wing assembly. After two months time, the applied polyurethane layer still had very good physical properties and has not evidenced any hydrolysis attack, or the like. The fuel resistance of such sprayed article remains excellent.

Furthermore, the urethane component of Formulas A, B, C or D have been prepared and stored in excess of four months. When tested, the percent of isocyanate level is still very high and almost identical to the original level. In contrast, the urethane component of the prior formulation, that is as set forth in U.S. Pat. No. 4,247,678, when plotted on a chart showing the percent of isocyanate loss per day, exhibited a slope of −0.011. Such a composition after ten day storage was unsuitable for forming a polyurethane when sprayed. That is, the sprayed layer did not have good physical properties, and did not form a good fuel resistant layer.

Thus, the components set forth in the cement will virtually have no degradation or harmful affect upon storage. To date, such a component, as set forth in Formula C has been stored six months without any notable deleterious affect. Naturally, the curing agent component, so long as sealed, will also not degrade over a long period of time.

According to the present invention, a urethane fuel-resistant laminate can be formed by first applying Formulation A to an in situ fuel tank. The first layer hence produces a black coating. Formulation C is then sprayed upon the first layer. The second layer is applied until all black areas are now white. Due to the utilization of the white contrasting color, all uncertain areas, cracks, and the like, are readily discerned as to whether or not they had been coated. In a similar manner, Formulation A is sprayed upon the white layer until a continuous black layer is formed. Then, Formulation C is sprayed forming a fourth layer in a similar manner, and finally Formulation A is sprayed thereover forming a fifth layer. In such a manner, a laminate is produced with a visual certainty that all crevices, cracks or hard-to-coat items or areas have been sufficiently coated with the polyurethane of the present invention. In the coating of a simulated wing structure cavity, a low pressure air spray gun was utilized. In order to prevent formation of agglomerations, the formulation was strained through an 80 to 100 mesh screen. However, in an actual application, it would be desired to utilize high pressure spray equipment such as an airless spray gun operating at a pressure of above 1,500 psi.

The five-layer contrasting laminate was then tested with JP-4 fuel at temperatures ranging from −40° F. to +200° F. All elevated temperature (+200° F.) cycles were conducted without JP-4. In addition to the temperature cycling, the structure was subjected to internal pressure cycles of 0 to 5 psi every two minutes. The structure was also subjected to cyclic deflections in order to apply loads to the internal coating at the edges of metal brackets where they attach to the skin. Coated test structures have survived 222 actual test hours without leaking or apparent deterioration of the coating under these conditions. This is estimated to be equivalent to 8,000 flight hours or two times the estimated life of an actual aircraft. Hence, it is apparent that the contrasting laminate of the present invention ensures that a proper laminate is applied as to an in situ aircraft wing. Moreover, such an application permits a larger fuel cavity to be utilized and hence extends the range of an aircraft. Of course, the present invention can be utilized for other articles as noted above.

In the formulation of Table II, the thixotropic agent was placed in the cure component. Upon spraying at low pressure, that is under approximately 150 psi with an air type spray gun, a coating was produced which was free of agglomerations. This was true regardless of whether a black or a white pigment was utilized.

TABLE II

| FORMULATION | E | F |
|---|---|---|
| Prepolymer (% NCO = 3.35) | 100.00 | 100.00 |
| Toluene | 56.27 | 56.27 |
| "Modaflow" | 1.00 | 1.00 |
| "EPON 1001-B-80" | 6.25 | 6.25 |
| Carbon Black | 1.27 | — |
| Methylethylketone (MEK) | 37.35 | 50.37 |
| 60% titanium dioxide in "EPON 828" | — | 10.48 |
| Methylene dianiline (MDA) | 7.34 | 7.34 |
| MEK | 65.22 | 65.22 |
| "Cab-o-Sil M-5" | 4.58 | 4.58 |
| TOTAL | 279.28 | 301.51 |
| Percent Solids | 42.68 | 42.59 |
| Diamine/diisocyanate ratio | .93 | .93 |

While in accordance with the patent statutes, a best mode and preferred embodiment has been descirbed, the invention is limited by the scope of the attached claims.

What is claimed is:

1. A process for preparing a laminated polyurethane sealant integral fuel tank within an article, comprising the steps of:
    forming a first in-situ polyurethane layer within the article by directly applying said first layer to said article,
    applying at least one in-stiu contiguous polyurethane layer having a contrasting color to said first in-situ layer,
    completely covering said first in-stu polyurethane layer with said contrasting contiguous in-situ layer so that a contiuous sealant layer is formed, and
    thereby forming the integral fuel tank having an increased fuel capacity due to said in-situ and direct application of said polyurethane layers to said article.

2. A process according to claim 1, including making each said polyurethane layer from about 100 parts by weight of a urethane polymer or prepolymer, a curing agent, an epoxy having solvent leaching resistance, and a thixotropic compound;
    wherein said urethane or said urethane prepolymer is the reaction product of (1) an aliphatic polyisocyanate having from 3 to 12 carbon atoms, or an alicyclic polyisocyanate having from 5 to 25 carbon atoms and (2) a mixed polyester, said mixed polyester being (a) a copolymerization condensation product of, or (b) a separate physical blend of, an aliphatic dicarboxylic acid having from 2 to 12 carbon atoms or an aromatic dicarboxylic acid having from 8 to 12 carbon atoms with a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000, and wherein the equivalent ratio of said isocyanate to the OH end groups in said polyester ranges from about 1.5 to about 3.0;
    wherein said curing agent is selected from the group consisting of an alkyl diamine having from 2 to 10 carbon atoms, a cycloalkyl diamine having from 4 to 20 carbon atoms, an aromatic or an alkyl substituted aromatic diamine having from 6 to 20 carbon atoms, a polyol having a molecular weight of 500 or less, and wherein the equivalent ratio of said diamine or said polyol to said polyisocyanate ranges from about 0.8 to about 1.2; and
    wherein the amount of said thixotropic agent ranges from about 2 to about 8 parts by weight, wherein the amount of said epoxy ranges from about 3 to about 7 parts by weight.

3. A process according to claim 1, wherein each subsequent in-situ contiguous polyurethane layer has a contrasting color to the preceding contiguous polyurethane layer so that continuous subsequent sealant layer is formed.

4. A process according to claim 3, wherein said integral fuel tank is located within an aircraft.

5. A process according to claim 3, including making each said polyurethane layer from about 100 parts by weight of a urethane polymer or prepolymer, a curing agent, an epoxy having solvent leaching resistance, and a thixotropic compound;
    wherein said urethane or said urethane prepolymer is the reaction product of (1) an aliphatic polyisocyanate having from 3 to 12 carbon atoms, or an alicyclic polyisocyanate having from 5 to 25 carbon atoms and (2) a mixed polyester, said mixed polyester being (a) a copolymerization condensation product of, or (b) a separate physical blend of, an aliphatic dicarboxylic acid having from 2 to 12 carbon atoms or an aromatic dicarboxylic acid having from 8 to 12 carbon atoms with a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000, and wherein the equivalent ratio of said isocyanate to the OH end groups in said polyester ranges from about 1.5 to about 3.0;
    wherein said curing agent is selected from the group consisting of an alkyl diamine having from 2 to 10 carbon atoms, a cycloalkyl diamine having from 4 to 20 carbon atoms, an aromatic or an alkyl substituted aromatic diamine having from 6 to 20 carbon atoms, a polyol having a molecular weight of 500 or less, and wherein the equivalent ratio of said diamine or said polyol to said polyisocyanate ranges from about 0.8 to about 1.2; and
    wherein the amount of said thixotropic agent ranges from about 2 to about 8 parts by weight, wherein the amount of said epoxy ranges from about 3 to about 7 parts by weight.

6. A process according to claim 1, including separately forming a polymer component, said polymer component comprising a urethane or urethane prepolymer and a urethane solvent, separately preparing a curing component, said curing component comprising said urethane curing agent and a curing agent solvent, and separately preparing a cement component, said cement component comprising an epoxy having solvent leaching resistance, and a solvent, wherein a thixotropic compound is located in said cement component, or in said cure component, or in both, the total amount of said solids in said overall formulation ranging from about 20 percent to about 60 percent by weight based upon the total amount of said solvent in said overall formulation, and mixing said components and forming said urethane layer.

7. A process according to claim 6, wherein the amount of said urethane polymer or prepolymer in said urethane component is about 100 parts by weight,
    wherein said urethane or said urethane prepolymer is the reaction product of (1) an aliphatic polyisocyanate having from 3 to 12 carbon atoms, or an alicyclic polyisocyanate having from 5 to 25 carbon atoms and (2) a mixed polyester, said mixed polyester being (a) a copolymerization condensation product of, or (b) a separate physical blend of, an aliphatic dicarboxylic acid having from 2 to 12 carbon atoms or an aromatic dicarboxylic acid having from 8 to 12 carbon atoms with a polyol having a molecular weight of 500 or less, the amount of said aliphatic dicarboxylic acid ranging from about 90 percent to about 10 percent by weight, the molecular weight of said polyester made from said acid and said polyol ranging from about 500 to about 4,000, and wherein the equivalent ratio of said isocyanate to the OH end groups in said polyester ranges from about 1.5 to about 3.0;
    wherein said curing agent is selected from the group consisting of an alkyl diamine having from 2 to 10 carbon atoms, a cycloalkyl diamine having from 4 to 20 carbon atoms, an aromatic or an alkyl substituted aromatic diamine having from 6 to 20 carbon atoms, a polyol having a molecular weight of 500 or less, and wherein the equivalent ratio of said diamine or said polyol to said polyisocyanate ranges from about 0.8 to about 1.2; and wherein the amount of said thixotropic agent ranges from about 2 to about 8 parts by weight, wherein the amount of said epoxy ranges from about 3 to about 7 parts by weight.

8. A process according to claim 7, wherein at least 90 percent of said polyisocyanate is an alkyl diisocyanate having from 6 to 10 carbon atoms or a cycloalkyl diisocyanate having from 8 to 15 carbon atoms, wherein said polyol forming said polyester is a glycol having from 2 to 10 carbon atoms, wherein said aliphatic dicarboxylic acid has from 6 to 9 carbon atoms, and wherein the equivalent ratio of said isocyanate to the hydroxyl end groups in said polyester ranges from about 1.8 to about 2.2, wherein said polyester has a molecular weight of from about 1,000 to about 3,000, wherein said polyol forming said polyester has a molecular weight of 200 or less, wherein the amount of thixotropic agent ranges from about 3 parts to about 6 parts by weight, wherein the amount of solids in said urethane component ranges from about 50 to about 75 percent, wherein the amount of solids in said curing agent component ranges from about 5 to about 30 percent by weight, and wherein the amount of solids in said cement component ranges from about 25 parts to about 250 parts by weight, wherein said curing agent in said curing agent component is a diamine, and wherein the equivalent ratio of said diamine to said isocyanate ranges from about 0.9 to about 0.95.

9. A process according to claim 8, wherein said thixotropic agent is silicon dioxide and is located in said cure component, wherein said epoxy is 4,4'-isopropylidenedipheno-epichlorohydrin, wherein said polyisocyanate is methylene bis(4-cyclohexylisocyanate), and wherein said aliphatic dicarboxylic acid is azelaic acid, and wherein said aromatic dicarboxylic acid is isophthalic acid, and wherein said diamine is selected from the group consisting of methylenedianiline, (bis-4-aminocyclohexyl) methane, 1,3-bisaminomethylcyclohexane, ethylene diamine, and hexamethylene diamine.

10. A process according to claim 8, wherein said fuel tank is located in an aircraft.

* * * * *